United States Patent

Le Carvennec

[11] Patent Number: 5,864,526
[45] Date of Patent: Jan. 26, 1999

[54] OPTICAL FOCUSSING ADJUSTMENT DEVICE

[75] Inventor: François Le Carvennec, Cernay, France

[73] Assignee: Thomson-CSF, Paris, France

[21] Appl. No.: 732,341

[22] PCT Filed: Mar. 8, 1996

[86] PCT No.: PCT/FR96/00372

§ 371 Date: Oct. 30, 1996

§ 102(e) Date: Oct. 30, 1996

[87] PCT Pub. No.: WO96/28815

PCT Pub. Date: Sep. 19, 1996

[30] Foreign Application Priority Data

Mar. 14, 1995 [FR] France .................. 95 02922

[51] Int. Cl.$^6$ .................................. G11B 7/09
[52] U.S. Cl. .................... 369/44.29; 369/44.26; 369/44.35
[58] Field of Search .................. 369/44.26, 44.27, 369/44.28, 44.29, 44.34, 44.35, 44.36, 44.41

[56] References Cited

U.S. PATENT DOCUMENTS

| | | |
|---|---|---|
| 4,023,033 | 5/1977 | Bricot et al. . |
| 4,037,251 | 7/1977 | Bricot et al. . |
| 4,038,524 | 7/1977 | Puech et al. . |
| 4,142,208 | 2/1979 | Oprandi et al. . |
| 4,387,452 | 6/1983 | Bricot et al. . |
| 4,562,564 | 12/1985 | Bricot et al. . |
| 4,695,158 | 9/1987 | Kotaka et al. . |
| 4,786,794 | 11/1988 | Doi . |
| 4,868,604 | 9/1989 | Le Carvennec et al. . |
| 5,475,672 | 12/1995 | Le Carvennec . |

FOREIGN PATENT DOCUMENTS

| | | |
|---|---|---|
| 319033 | 6/1989 | European Pat. Off. . |
| 0089274 | 9/1989 | European Pat. Off. . |
| 2271590 | 12/1975 | France . |
| 2523347 | 9/1983 | France . |
| 359207033A | 11/1984 | Japan . |
| 61-042763 | 1/1986 | Japan . |
| 401119925A | 5/1989 | Japan . |
| 401307023A | 12/1989 | Japan . |

Primary Examiner—Thang V. Tran
Attorney, Agent, or Firm—Oblon, Spivak, McClelland, Maier & Neustadt, P.C.

[57] ABSTRACT

System for the adjustment of the focusing of a beam on a carrier (5). A first detector (CA) with a wide dynamic range of detection and with limited stability measures the light reflected by the carrier (5). A second detector (CB) with a small dynamic range of detection, high stability and high precision also enables the measurement of the light reflected by the carrier (5). Control circuits are used to control a focusing control device (B). A control logic is used to place the operation of the control device (B) under the control of the first focusing error signal when this signal goes beyond a specified value (a) until the second focusing error signal goes beyond another specified value, the working of the control device (B) being then placed under the control of this second focusing error signal.

20 Claims, 5 Drawing Sheets

OPTICAL FOCUSSING ADJUSTMENT DEVICE

The invention relates to a focusing adjustment or focusing control system and especially to a system used to adjust the focusing of a light beam for the recording and/or reading of information elements on a mobile carrier. It can be applied especially to an instrument for the reading and/or recording of optical or magneto-optical disks.

The invention can be applied to the recording of computer data but it can also be applied to the technique of compact disks as well as video disks.

An optical recording carrier is most usually formed by a reflective surface, in most cases in the form of a disk, having discontinuous and small-sized alterations arranged along tracks. The most common type of carrier at present is the audio disk called a compact disk. In this case, the alterations are micro-troughs or more generally micro-reliefs on the reflective plane surface. These micro-reliefs have a width of about 0.4 micrometers and the axes of two neighbouring tracks are separated by a distance (called the pitch) of 1.6 micrometers.

The presence of these micro-reliefs is detected by means of a machine with a laser whose beam is focused on the reflective surface, the dimension of this beam being minimised so that it reaches only one micro-relief at a time. When the beam reaches the reflective surface, the light is reflected. When the beam reaches a micro-relief, diffraction takes place. In other words, the light is dispersed in every direction. The device is such that for a reflection of the beam on the smooth surface, detectors receive a maximum amount of energy and when this beam reaches a micro-relief, these detectors receive only a part of the light energy owing to the diffraction that has caused part of the beam to escape from the optical system provided between the disk and the detectors.

The disks or other pre-recorded carriers usually have all their information elements in micro-relief form. By contrast, in disks on which recording can be done, it is generally only the pre-recorded information or the preformat that is in micro-relief form, the information being recorded by the forming of other alterations, namely modifications of the reflection coefficient or, for magneto-optical disks, the modification of the magnetisation which, in reading, is expressed by a rotation of polarisation.

The pre-recorded information or preformat defines a track configuration.

The working of the reading and/or recording device is accurate only if the reading laser beam (or recording laser beam) is focused on the reflective surface of the disk.

To enable the permanent focusing of the laser beam on the reflective surface, it is necessary to provide for a servo-control system with a means to measure the divergence in focusing in terms of magnitude and sign.

Known systems can achieve this focusing adjustment function with devices that have a wide dynamic range of detection and provide a wide range of adjustment. These are, for example, continuous type detectors. An example of a detector is given in the French patent No. 74 01283 in which an effect of astigmatism is introduced into the focusing reading beam by means of a cylindrical lens. Four photo-detectors are positioned in the form of a cross. When the focusing is set in a normal way, the four photodetectors receive the same quantity of light. When the focusing is displaced in one direction, two diametrically opposite photodetectors receive more light than the other two. The reverse occurs when the focusing is displaced in the opposite direction. The drawback of this type of detector is that its zero adjustment error position may vary in time.

The focusing adjustment may be done also with "sampler" type detectors as described in the French patent No. 2 523 349. In this system, the information carrier has at least one first mark on the side of the axis of an information track and one second mark on the other side of the same axis. Two photodetectors are positioned on either side of a plane containing the axis of the track and receive the light transmitted by the carrier during the scanning of the first mark and then the second mark. The differences in the quantities of light detected can be used to determine any error of focusing in terms of sign and amplitude. The drawback of such a system is that it has a small dynamic range.

The invention provides a system that enables these different types of sensors to be brought together and makes it possible to give a system that has a wide dynamic range of detection and is incapable of being disturbed. This system provides for the transmission to the carrier of a reading beam that is stigmatic. This provides for a more efficient distribution of energy along the section of the beam.

The invention therefore relates to a system for the adjustment of the focusing of an optical device comprising an optical system for the focusing of a light beam on a carrier plane and a device to control the displacement of the focusing point in relation to the plane of the carrier, characterised in that said light beam is stigmatic and comprises at least:

- a first detector possessing a specified dynamic range of detection of focusing, receiving the beam reflected by the carrier and giving a first focusing error signal expressing the error in the focusing of the beam on the carrier;
- a second detector having a dynamic range of detection of focusing that is smaller than the dynamic range of the first detector receiving the stigmatic beam reflected by the carrier and giving a second focusing error expressing the error of the focusing of the beam on the carrier;
- a control logic unit receiving the first error signal and a second error signal and activating the operation of the control device.

The two detectors may have different dynamic ranges. However, without taking account of the dynamic ranges, they may have different setting characteristics (for example in terms of precision). It is therefore appropriate to make them cooperate so as to obtain a system that makes the most efficient use of their characteristics for the focusing adjustment.

The invention therefore relates also to a system for the adjustment of the focusing of an optical device comprising an optical system for the focusing of a light beam on a carrier plane and a control device to control the displacement of the focusing point with respect to the plane of the carrier, characterised in that said device comprises at least:

- a first detector receiving the light reflected by the carrier and giving a first focusing error signal expressing the error of the focusing of the beam on the carrier;
- a second detector also receiving the light reflected by the carrier and giving a second focusing error signal expressing the error of focusing of the beam on the carrier, this second detector having a dynamic range of detection that is smaller than that of the first detector;
- a control logic unit used to place the operation of the control device under the control of the first focusing error signal when this signal goes beyond a specified value, until the second focusing error signal goes beyond another specified value, the operation of the control device being then placed under the control of this second focusing error signal.

An optical or magneto-optical carrier has a main surface on which information elements are recorded. These information elements may be optical marks (such as variations in index, reliefs, variations in reflective capacity) or magnetic marks. The adjustment of the focusing of the reading or recording beam can be done on this surface. However, the adjustment obtained is imprecise. The carrier may also contain information elements that are optically readable by optical or magneto-optical reading means. In this case, the focusing adjustment can be done on these information elements. In this case, the range of adjustment is narrower but the precise setting is more stable.

The invention provides for combining these two types of adjustment.

The invention also relates to a system to adjust the focusing of an optical device comprising an optical system for the focusing of a light beam on a carrier plane comprising a surface bearing information elements recorded in the form of optical or magnetic marks as well as a device to control the displacement of the focusing point in relation to the plane of the carrier, characterised in that said light beam is stigmatic and in that said system comprises:

- a first detector enabling an adjustment of focusing with respect to the surface of the carrier and giving a first focusing error signal;
- a second detector enabling an adjustment of focusing by detection of the information elements recorded;
- a control logic unit receiving the first error signal and the second error signal and activating the operation of the control device.

The various objects and characteristics of the invention shall appear more clearly in the following description and in the appended figures, of which.

Figure 1A:
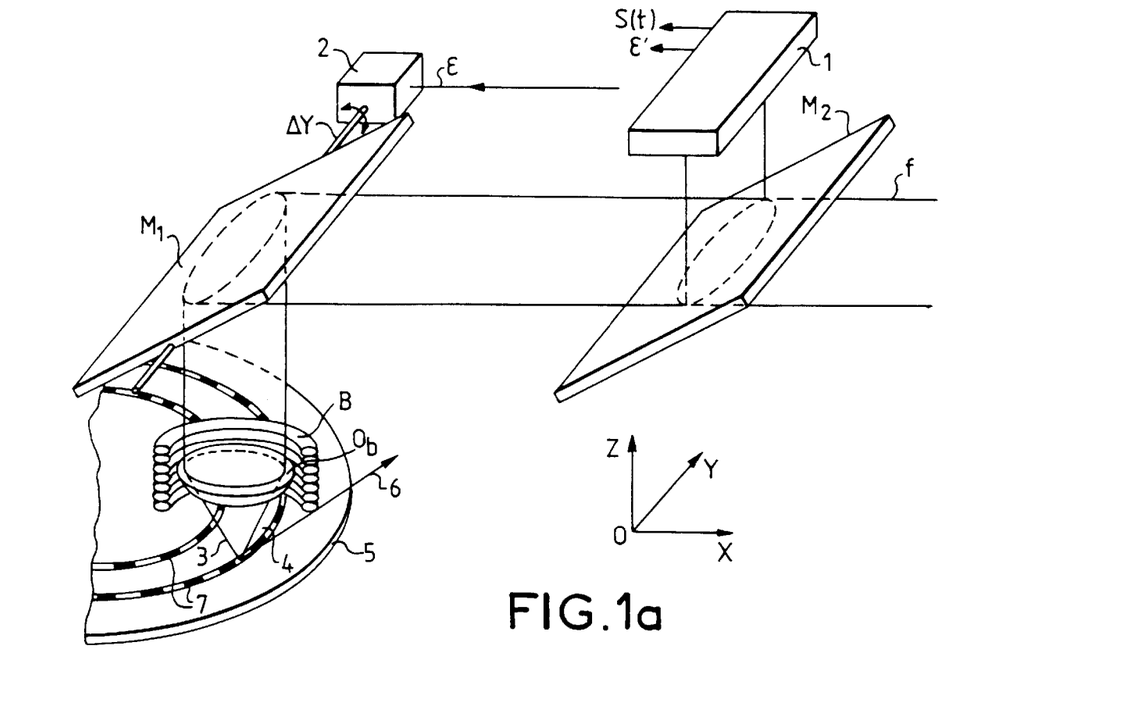
FIGS. 1a to 1c show a system known in the prior art.
Figure 1B:
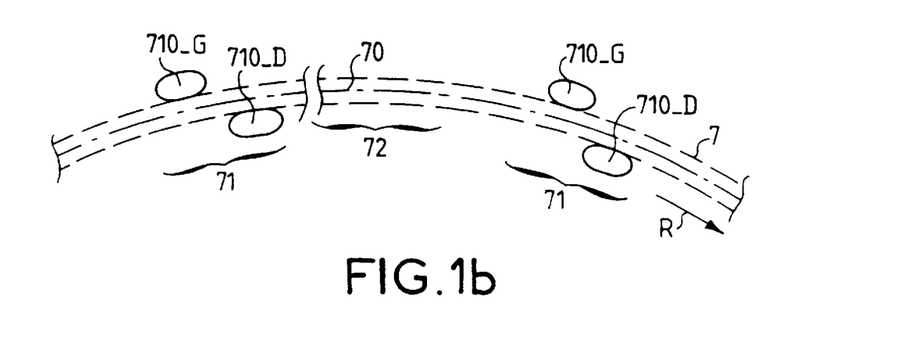

Referring to FIGS. 1a and 1b, first of all and by way of an example, a description shall be given of an application of the invention to the focusing of a light beam on an information carrier 5 such as an optical disk.

According to FIG. 1a, this disk may rotate in a plane XY about an axis parallel to the third axis of a referential trihedron XYZ. The lower face of this disk is herein assumed to be smooth. The upper face which is parallel to it is also smooth but has a pre-etched track 7 in the form of a smooth track whose substantially constant width is approximately equal to or is smaller than one micrometer.

Such a disk can be used either for the recording of information elements at a specific point of one of the smooth tracks on which recording has been done beforehand, or for the reading of information elements recorded at any point of this track. The disk for example has a diameter of about 30 cm. and is driven by a rotational motion communicated by a drive motor fixedly joined to the frame of the optical recording/reading system. In this exemplary embodiment, the device providing access to a predetermined track of the disk has a fixed part comprising a source of light energy (not shown in FIG. 1) and a mobile part formed by the recording/reading head. As is known, the latter has a microscope type objective $O_b$, fixedly joined to an electromagnetic coil B that shifts in the magnetic field of a permanent magnet (not shown) providing for vertical servo-control or the focusing and a galvanometer mirror $M_1$ providing for radial servo-control. The light source is usually a semiconductor-based laser source whose laser beam has to be magnified in order to cover the entrance pupil of the objective, this being done whatever may be the position of the objective along the optical axis.

The objective $O_b$ focuses the beam at the point 3 on the information carrier disk 5. This disk is driven by a rotational motion symbolised by the arrow 6. The objective $O_b$ and the mirror $M_1$ are fixedly joined to a mobile piece of equipment forming the recording/reading head. The forward movement of this mobile piece of equipment may be obtained by any known means.

The disk 5 has a pre-etching of the track that may have different appearances. It may be, for example, a hollow pre-etching with a set of elements of tracks arranged in concentric circles or organised in the form of a spiral. The width of the track elements is chosen so as to be slightly smaller than the diameter of the light spot and these elements are separated by inter-track regions whose width is slightly greater than the width of the track. The upper surface of the carrier receives a thin layer that is appropriate to recording by a thermo-optical method. This arrangement of elements is used to explore the track before recording.

To detect the reading beams reflected by the disk, a semi-transparent plate $M_2$ for example is interposed in the path of the beam $f_1$. The reflected beam is then sent towards photodetection and signal-processing means 1 which may deliver firstly an error signal $\epsilon$ that enables the activation of the motor 2 used to guide the position of the mirror $M_1$, achieving a radial servo-control. These means 1 may deliver secondly an error signal $\epsilon'$, enabling the control of the coil B fixedly joined to the objective OB thus obtaining a focusing servo-control system. All these techniques are well known to those skilled in the art and fall outside the framework of the invention.

The use of discrete pre-etchings makes it possible to overcome the difficulties related to radial tracking. FIG. 1b shows an example of pre-etching.

It has at least one mark 710G to the left of the axis 70 of the track and one mark 710D to the right of the axis of the track. The zone 72 located between two groups of marks 710G–710D is used to record the data information elements.

Figure 1C:
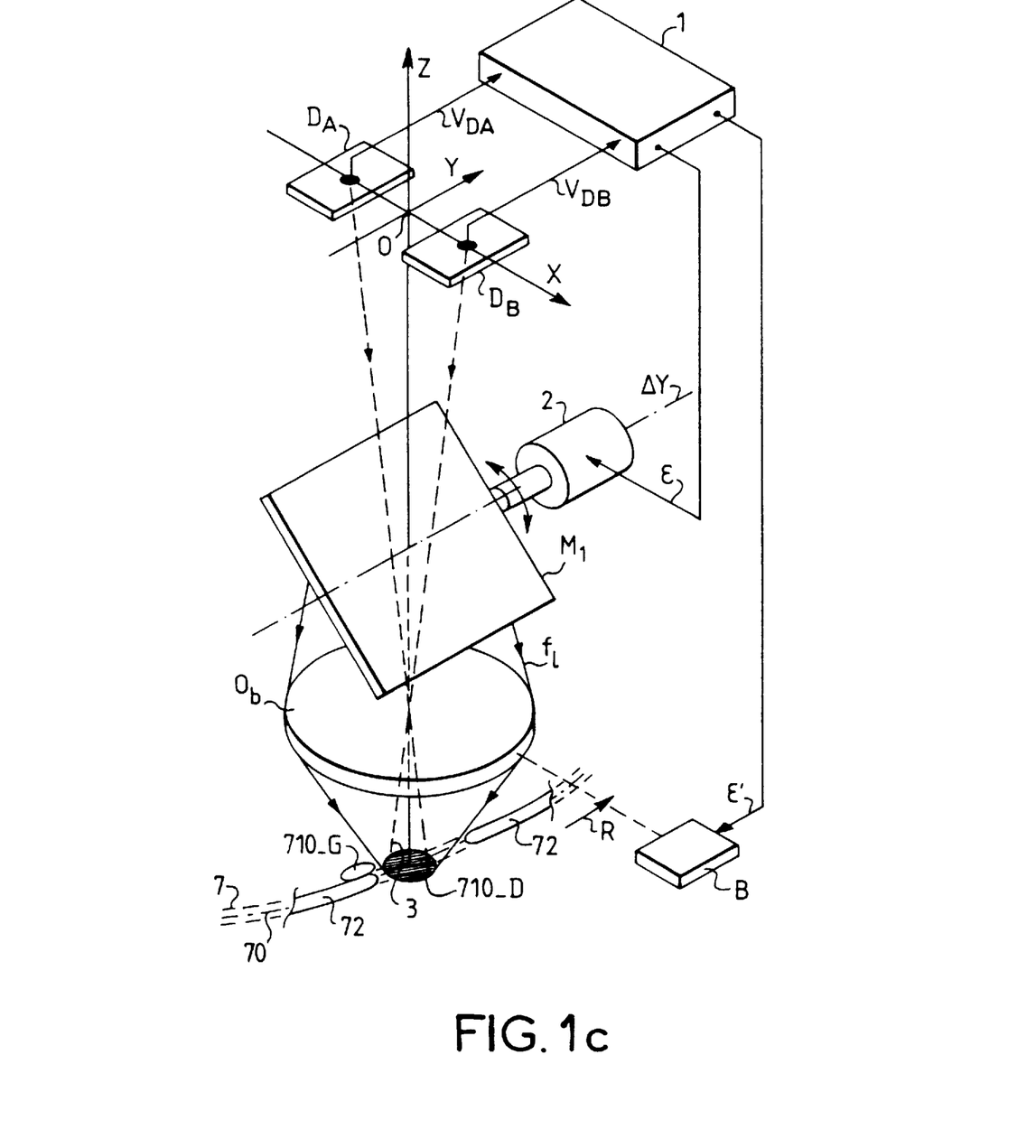

The detector 1 of FIG. 1 a has two photodetectors $D_A$, $D_B$ located on each side of a plane containing the axis of the track (see FIG. 1c).

With regard to the focusing, the track 7 of the carrier to be followed is included in a plane between the objective and its focus. The signals detected by the photodiode $D_A$ due to the two sections displaced to the right (710-D) are greater than those detected by the photodiode $D_B$. The reverse occurs during the passage of a section displaced to the left (710-G).

If the track 7 to be followed is within a plane that is at a greater distance from the objective than the focus, effects are observed that in every way are complementary to what has just been described. To determine the focusing error signal $\epsilon'$, the detector signals $V_A$ or $V_B$ reproduced from the groups of marks and $V_{A1}$ and $V_{B1}$ respectively are sampled during the passage of the first section 7.

$V_{A2}$ and $V_{2B}$ are sampled during the passages of the second section, and the following algebraic operation is performed:

$$(V_{A1}+V_{B2})-(V_{A2}+B_{B1})$$

The result is proportional to the focusing error signal, in terms of sign and amplitude.

Figure 2A:
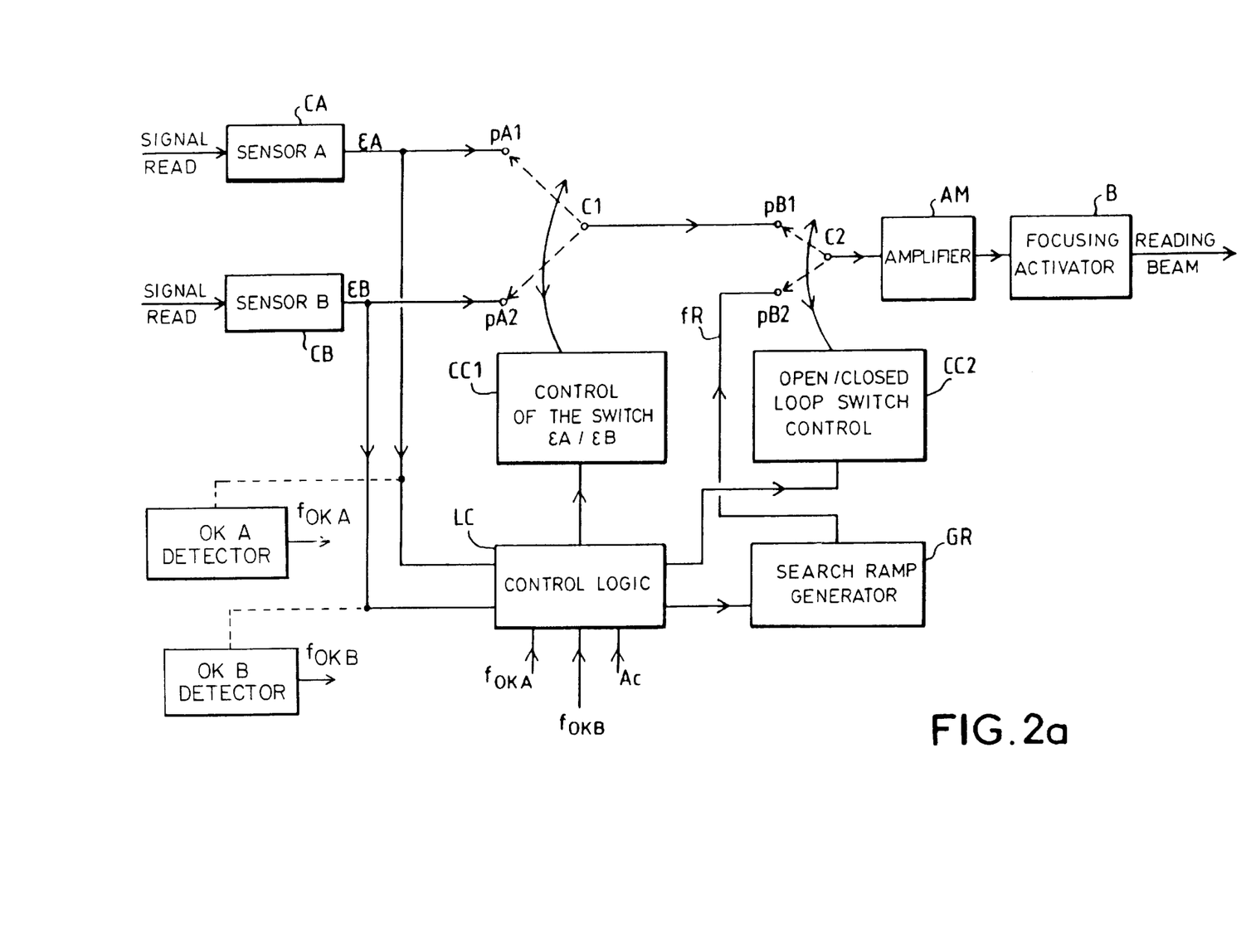
FIGS. 2a and 2b show a focusing system according to the invention.

Referring to FIG. 2a, a description shall be given of an exemplary embodiment of the focusing adjustment system according to the invention:

This system has a focusing adjustment control device that acts on the coil B used to control the focusing of the objective Ob (of FIG. 1a) and enables its focusing point to be displaced along a line perpendicular to the plane of the information carrier 5.

Detectors CA and CB receive the light reflected by the carrier 5. The detector CA has a wide dynamic range of detection but is of dubious stability as is shown in the curve A of FIG. 2b. It must be considered to be imprecise and liable to be disturbed. The detector CB on the contrary has a small dynamic range of detection, high precision and high stability as illustrated by the curve B of FIG. 2b.

A switch-over system with at least two contacts C1, C2 enables the focusing control device B to be connected either to a search ramp signal generator RF or to the detector CA or to the detector CB.

A control logic LC enables the management of the working of the system and the control of the ramp signal generator GR and of the control circuits CC1, CC2 of the contacts C1, C2.

The system works as follows.

A request for a focusing process represented by the signal AC is given to the control logic unit LC by means not shown.

The control logic unit then, using the circuits CC1 and CC2, achieves the switch-over of the contacts C1 and C2 respectively to the positions pA1 and pB2.

Figure 3A:
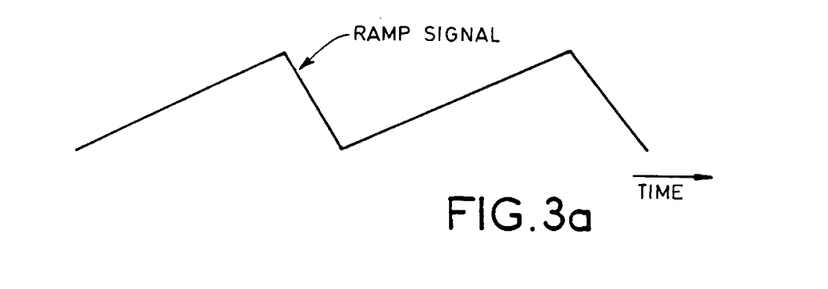
FIGS. 3a and 3b show curves of operation of the system according to the invention.

A ramp signal as shown in FIG. 3a is generated and applied to the focusing adjustment device B in order to ensure the displacement of the focusing point of the beam perpendicularly to the information carrier surface (carrier 5). The movement of this focusing point of the beam is such that the surface of the carrier 5 can enter the zone of the sensor of the detector CA. A position error signal $\epsilon A$ is then generated by the detector CA.

When the signal $\epsilon A$ reaches a predetermined value $\alpha$, the control logic unit LC provides for the passage of the switch C2 into the position pB1 (closed loop). The loop is then supplied by the error signal $\epsilon A$.

The servo-mechanism can then lock in and the point of operation of the loop gets displaced (see FIG. 2b) on the curve A from the point A towards the point O', which is a stable point of equilibrium of the loop (corresponding to a signal $\epsilon A=0$).

Figure 2B:
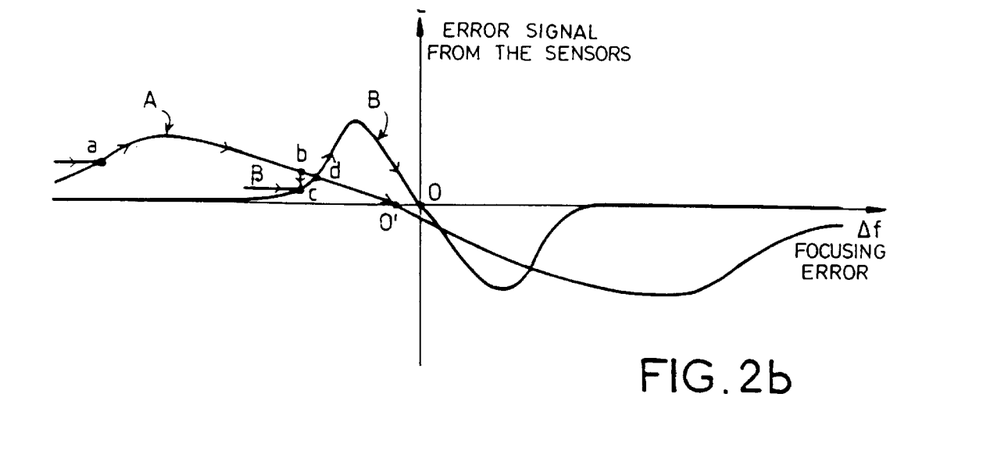

When this is done, the focusing point of the beam between the zone of capture of the detector CB and a signal $\epsilon B$ is generated. When this signal reaches a predetermined value $\beta$, the control logic unit switches over the switch C1 to the position pA2. The loop is then supplied by the error signal $\epsilon B$. The point of operation then goes from the point b of the curve A to the point c of the curve B.

It must be noted that the switching over of the contact C1 to the position pA1 can be done after the system is put into operation. It must be effective at the time when the contact C2 passes into the position pB1.

In FIG. 2b, the point of operation now gets displaced from the point C to the point d and then to the point 0, which is the stable position of the loop (connected to the detector B) ($\epsilon B=0$) corresponding to an efficient focusing ($\Delta f=0$) that is more precise than the one corresponding to the point 0'.

Figure 3B:
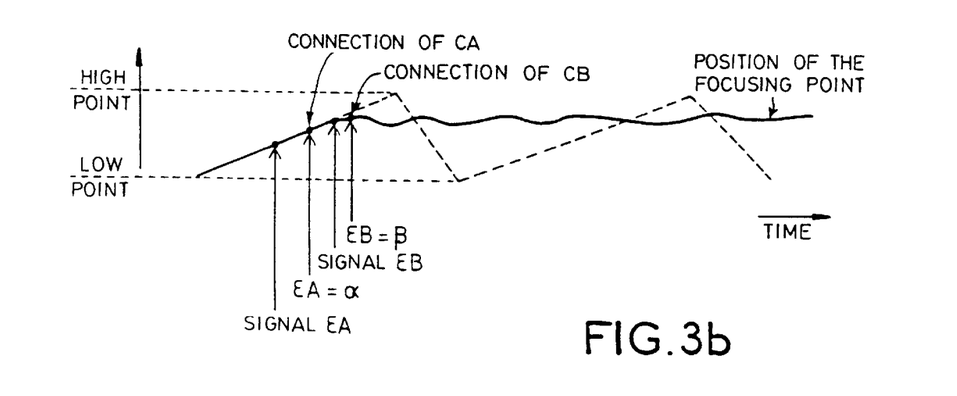

FIG. 3b shows an example of the displacement of the focusing point during the above-described operation.

Figure 4A:
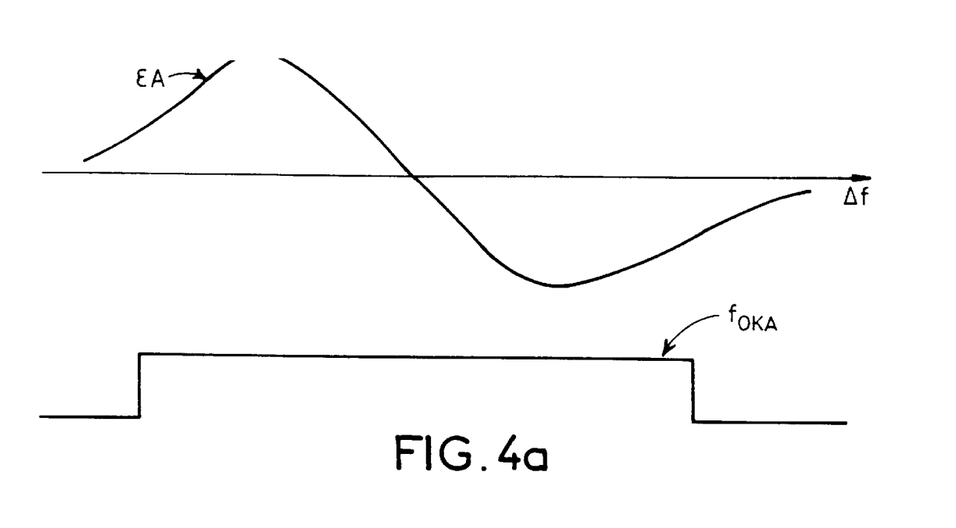
FIGS. 4a and 4b show curves giving a detailed view of the operation signals according to the invention.
Figure 4B:
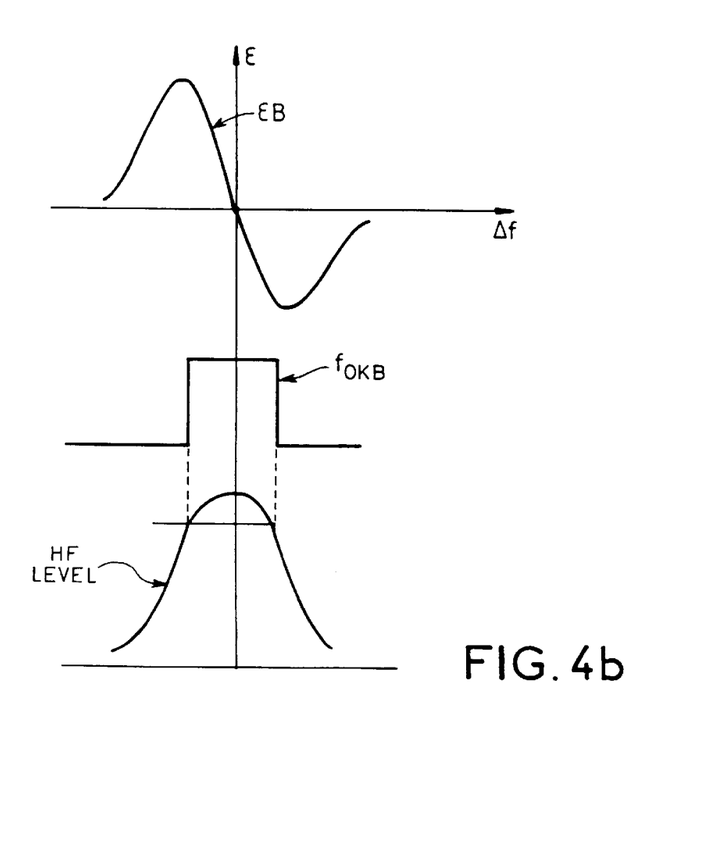

The working of the device during the above-mentioned sequences may be controlled by means of signals fOKA, fOKB (focusing OK) that correspond to significant values, namely values greater than threshold values. These signals make it possible especially to remove the ambiguity pertaining to the meaning of the signals $\epsilon A$, $\epsilon B$. Values close to 0 may indeed be obtained in different regions of the curves A and B. The signals read then take significant values that are different in these zones (see FIGS. 4a and 4b).

These signals may be used to:

determine the good points a, b (fOKA, fOKB);

check the locking in at a, b (fOKA, fOKB);

check the loss of focusing (fOKA, fOKB).

More specifically, during a focusing command, if the signal fOKA is not given (fOKA=0), the signal fOKB) is not given (fOKb=0), the system activates the working of the ramp signal generator GR until the error signal $\epsilon A$ becomes greater than a threshold level a and fOKA=1. The adjustment is then done with the detector CA until the error signal $\epsilon B$ goes beyond the level b (see FIG. 2b) and fOKB=1, the focusing being then adjusted by the detector CB.

Here above, it has been assumed that during the focusing search command, the system is defocused. Hence, the different steps of the method have been resorted to: ramp signal, CA detector and then CB detector.

However if, during the focusing search command, the focusing error is small, a signal fOKA or fOKB for example is given and the system works from the point of operation at which is located in FIG. 2b.

For example, the signals fOKA and fOKB may be given (fOKA=1, fOKB=1) and the adjustment of the focusing then passes directly under the control of the detector CB.

According to another possible mode of operation, it is possible to have fOKA=1 and fOKB=0. In this case it may be chosen to place the focusing adjustment under the control of the detector CA until the signal $\epsilon B$ goes through the threshold b and until fOKB=1. If, at the end of a certain time lag, this does not occur, then the focusing adjustment goes under the control of the detector CB.

It must be noted that a simplified version of the system could consist in using only the signals fOKA and fOKB for the focusing adjustment. In this case, during a focusing search request, fOKA=0 and fOKB=0, the ramp signal generator gives the ramp signal until fOKA=1 and then the focusing adjustment is placed under the control of fOKA until fOKB=1.

According to one alternative embodiment, the detector CB may be a system for the detection of an error signal by wobbulation, namely a system inducing an oscillation of the adjustment of the focusing with synchronous detection to generate a relatively precise error signal.

According to an exemplary embodiment of the invention, the detector CA has a wide dynamic range of detection and has four photodetection cells. As described here above, its operation takes advantage of the astigmatism of the reading beam.

The detector CB is a detector of the sampled type and has two photodetection cells.

It must be noted that the two photodetection cells of the detector CB may be those of the detector CA.

In the foregoing description, a description has been given chiefly of the reading of an optical information carrier in which the information elements are optical marks (reliefs, index variations, variations of intensity by reflection among others). However, the carrier could also be a magnetic carrier having information elements characterised by orientation of magnetisation. The reading would then be a magneto-optical reading using the Kerr effect or the Faraday effect (by rotation of the polarisation of light).

I claim:

1. A system for adjusting focusing of an optical device, comprising:
    an optical system which focuses a light beam on a carrier surface;
    a focus control device controlling displacement of a focusing point of said light beam focused by said optical system in relation to the carrier surface;
    a first focusing detector having a first dynamic range of light beam focus detection, said first focusing detector receiving the light beam reflected by the carrier surface and outputting a first focusing error signal indicating an error in focusing of the light beam on the carrier surface;
    a second focusing detector having a second dynamic range of light beam focus detection that is smaller than the first dynamic range, said second focusing detector receiving the light beam reflected by the carrier surface and outputting a second focusing error signal indicating an error in the focusing of the light beam on the carrier surface;
    a device measuring the intensity of the light beam reflected by the carrier surface and providing a first focusing validity signal when the measured intensity of the light beam reflected by the carrier surface is higher than a specified level;
    a control logic unit receiving at least the first focusing error signal, the second focusing error signal and the first focusing validity signal to provide control of a switching system to supply an input to the focus control device to control operation of the focus control device.

2. The system according to claim 1, wherein the first focusing detector and/or the second focusing detector enable a detection of focusing from information elements recorded on the carrier.

3. The system according to claim 1, further comprising:
    a source generating a signal of continuous variation; and
    wherein the control logic unit controls the switching system to provide the signal with continuous variations to the focus control device from the source until the first focusing detector outputs the first focusing error signal to the control logic unit and the first focusing validity signal is received by the control logic unit whereupon said control logic unit controls the switching system to provide the first focusing error signal [being given to the control device (B) until the second detector (CB) gives a second focusing error signal.

4. The system according to claim 3, wherein the carrier surface bears information elements that are optically readable during a relative displacement of the focused light beam along the carrier surface and the system further comprises:
    means for measuring intensity of an information reading signal outputted by an information detector during optical reading of the information elements and for providing a second focus validity signal when the intensity of the information reading signal is measured to be above a second validity threshold to the control logic unit for processing to determine if a focus control operation with the received second focusing error signal can be initiated.

5. The system according to claim 4, wherein the control logic unit is enabled to initiate a focus control operation with the second focusing error signal only after receiving and processing both the first focusing validity signal and the second focusing validity signal.

6. The system according to claim 4, wherein the first switch is enabled by the control logic unit to connect either the first focusing error signal or the second focusing error signal to the focus control device.

7. The system according to claim 4, wherein the first focusing validity signal is a combination of the first focusing error signal and a signal indicating the intensity of the light received by the means for measuring the intensity of light reflected by the carrier and the second focusing validity signal is a combination of the second focusing error signal and a minimum signal value detected from the reading of information elements on the carrier by the information detector.

8. The system according to claim 1, wherein the first focusing detector comprises:
    four photodetection cells;
    an astigmatism device placed in the path of the light beam from the carrier surface; and
    a comparison circuit enabling a comparison of the quantities of light detected by the four photodetection cells.

9. The system according to claim 8, wherein two of the four photodetection cells of the first focusing detector are used to form the second focusing detector.

10. The system according to claim 1, wherein:
    the carrier surface includes two marks positioned on either side of an axis of relative displacement of the light beam in a zone of illumination of the light beam on the carrier surface and the second focusing detector has two photodetection cells, with each of the two photodetection cells being respectively positioned to detect the light beam from the carrier after it has interacted with a respective one of the two marks [on either side of the axis of the track on the plane of these cells; and
    a circuit is provided to enable a comparison of the quantities of light detected by the two photodetection cells during the reading of the two marks in succession.

11. The system according to claim 1, wherein the second focusing detector comprises a system of error detection by wobbulation in which means enable the inducing of an oscillation of the adjustment of focusing and in that means enable the detection, in synchronism, of the focusing error.

12. The system according to claim 1, wherein the carrier is an optical or magnetic information carrier.

13. The system according to claim 1, wherein the carrier is an optical disk.

14. The system according to claim 1, wherein the first focusing detector receives the light beam reflected by the carrier by means of an optical device inducing an effect of astigmatism on the reflected beam.

15. A system for adjusting focusing of an optical device, comprising:
    an optical system which focuses a light beam on a carrier surface;
    a focusing control device controlling the displacement of a focusing point of said light beam focused by said optical system with respect to the surface of the carrier;
    a first focusing detector receiving the light beam reflected by the carrier surface and outputting a first focusing error signal indicating an error in the focus of the light beam on the carrier surface;
    a second focusing detector also receiving the light beam reflected by the carrier surface and outputting a second focusing error signal indicating an error in the focusing of the light beam on the carrier surface, wherein the second focusing detector has a dynamic range of light beam focus detection that is smaller than the dynamic range of light beam focus detection of the first focusing detector;

a source generating a signal of continuous variation; and a control logic unit receiving at least the first focusing error signal and the second focusing error signal, said control logic unit controlling a switching system to provide the signal of continuous variation to the focus control device from the source at least until the first focusing error signal is determined by the control logic unit to exceed a first specified value, said control logic unit then controlling the switching system to place operation of the focus control device under control of the first focusing error signal until the control logic unit determines that the second focusing error signal exceeds a second specified value and controls the switching system to place operation of the focus control device under the control of the second focusing error signal.

16. The system according to claim 15, wherein the switching system further comprises:

a first switch enabling the connection of either the output of the first focusing detector or the output of the second focusing detector to the focus control device; and a second switch enabling the connection of either the source generating a signal of continuous variation or the first switch to the focus control device.

17. The system according to claim 15, wherein the first focusing detector comprises:

four photodetection cells;

an astigmatism device placed in the path of the light beam from the carrier surface; and a comparison circuit enabling a comparison of the quantities of light detected by the four photodetection cells.

18. A system for adjusting focusing of an optical device, comprising:

an optical system which focuses a light beam on a carrier surface bearing information elements recorded in the form of optical or magnetic marks;

a focus control device controlling displacement of a focusing point of said light beam focused by said optical system in relation to the surface of the carrier;

a first focusing detector enabling an adjustment of light beam focusing by said focus control device in relation to the surface of the carrier under control of a first focusing error signal outputted by said first focusing detector;

a second focusing detector enabling an adjustment of light beam focusing by said focus control device in relation to the surface of the carrier by detection of the light beam reflected by the information elements by said second focusing detector to output a second focusing error signal;

a device measuring intensity of light reflected by the carrier surface and providing a first focusing validity signal when the measured intensity of the light beam reflected by the carrier surface is higher than a specified first validity level; and a control logic unit receiving at least the first focusing error signal, the second focusing error signal and the first focusing validity signal to -determine a control signal to be applied as the input to the focus control device.

19. The system according to claim 18, wherein the information elements are information elements located on either side of an axis forming a track of information elements on the carrier surface.

20. The system according to claim 18, wherein the first focusing detector comprises:

four photodetection cells;

an astigmatism device placed in the path of the light beam from the carrier surface; and a comparison circuit enabling a comparison of the quantities of light detected by the four photodetection cells.

* * * * *